(No Model.)

J. WEBB.
FANCY GLASSWARE.

No. 363,190. Patented May 17, 1887.

WITNESSES:
A. B. Rawlings
Daniel Scott

Joseph Webb
INVENTOR

BY Connolly Bro
ATTORNEYS

UNITED STATES PATENT OFFICE.

JOSEPH WEBB, OF BEAVER, ASSIGNOR TO THE PHOENIX GLASS COMPANY, OF PITTSBURG, PENNSYLVANIA.

FANCY GLASSWARE.

SPECIFICATION forming part of Letters Patent No. 363,190, dated May 17, 1887.

Application filed September 9, 1886. Serial No. 213,163. (No model.)

*To all whom it may concern:*

Be it known that I, JOSEPH WEBB, a subject of the Queen of Great Britain, residing at Beaver, in the county of Beaver and State of Pennsylvania, have invented certain new and useful Improvements in the Manufacture of Fancy Glassware; and I do hereby declare the following to be a full, clear, and exact description of the invention, reference being had to the accompanying drawings, which form part of this specification.

This invention has relation to a method of manufacturing fancy glass, and has for its object the provision of a method of manufacturing fancy glassware or articles or pieces of glass heretofore unknown.

This invention consists in the production of glass articles by first forming a body-section cylinder, or other form of opaque glass, with indentations, cavities, or depressions in its surface, and while the indented opaque glass is still warm placing upon its indented surface a film, sheet, or coating of transparent glass in a heated condition, and then pressing the transparent film into contact with the opaque glass, so as to incorporate it therewith, thereby confining the air within the indentations or cavities in the opaque glass, and, finally, in roughening the transparent film by the use of acid or otherwise, in order to produce the desired effect.

Figure 1:
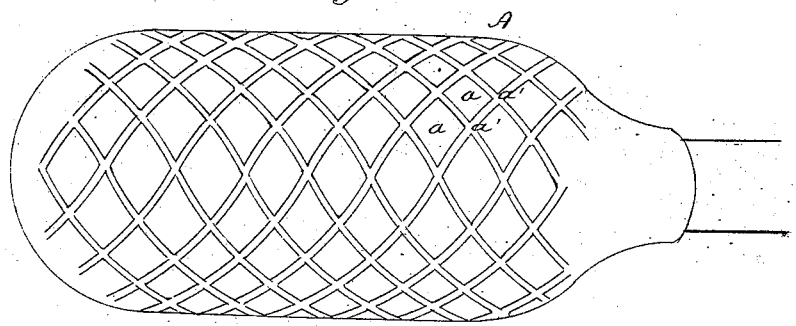
Figure 3:
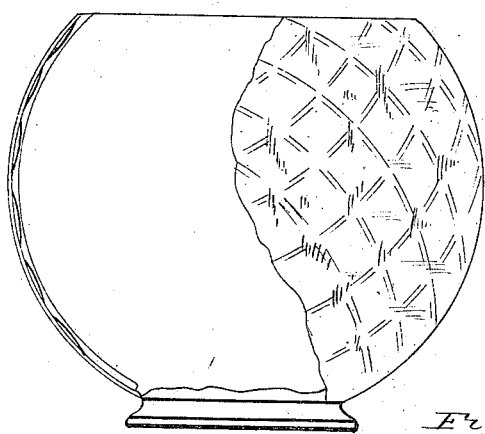
Figure 2:
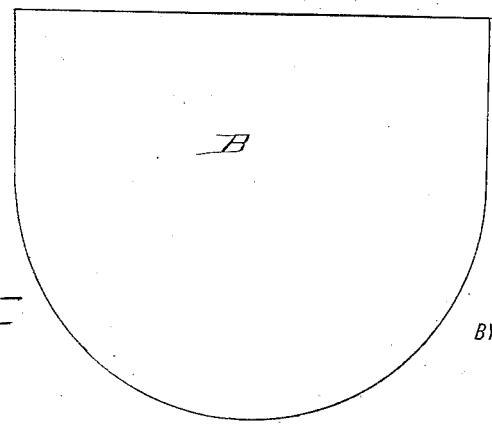

In the accompanying drawings, in Figure 1 is shown the section, body, or piece of opaque glass in the condition in which it appears before the attachment of the transparent coating or film. In Fig. 2 is shown the transparent film ready for application to the opaque section, and in Fig. 3 a sectional view of the opaque section and the transparent film together.

A designates the opaque body or section, having upon its surface indentations, cavities, or recesses $a'$ $a'$ $a'$. The opaque section or body A may be produced by any of the well-known processes of manufacturing glass; but the preferable form or manner of making it is to blow it in a suitable mold having elevations upon its surface adapted to form the indentations, recesses, or cavities on the surface of the opaque section; but these indentations, recesses, or cavities may be produced by what is termed in the art as "crackling" the surface of the opaque glass. In the drawings the opaque body or section A is shown as being of the ordinary pear-shaped form which a mass of blown glass first assumes.

B designates a transparent film or surface which is to be applied to the opaque section A. Said film is of a cup shape, and I also prefer to form it by the ordinary and well-known process of blowing. After the opaque section A and the transparent section B have been formed, as shown, and when the opaque section has been allowed to cool to such a degree that it will retain its shape, and while the transparent cup B is still hot enough to adhere thereto, the opaque section is inserted into the transparent cup, and the mass is then rolled upon a marver or other flat surface. The transparent film now adheres firmly to the raised portions of the opaque section, thereby confining the air in the recesses or indentations $a$ $a$ $a$. The article so formed is now one integral mass of glass, having bubbles of air between its opaque and its transparent walls, and may now be reheated and fashioned into any desirable article—such as a tumbler, pitcher, globe, shade, &c.

When the article is formed as described, the surface of the transparent film is roughened by means of acid, or by any suitable chemical or some chemical process, and this roughening will very materially add to the effect produced by the refraction of light in and by the cavities or indentations between the two films, the pencils or rays of light being broken up or decomposed by the roughened film and caused to impart to the surface a beautiful effect of delicate prismatic coloring or iridescence.

It is obvious that the method above described may be varied in many particulars without departing from the spirit of my invention. For instance, the transparent film may be placed on the interior of the opaque body, instead of upon the outside of the same, in which case, of course, the indentations or cavities will be formed upon the interior surface of the opaque section. Again, the indentations or cavities may be formed upon the transparent film, while the opaque section is made perfectly plain.

I am aware that it is not new to produce articles of glassware composed of two films of glass with intervening air-spaces by placing in the mold cams or strips of glass and welding them to the inner and outer cups; hence I do not claim, broadly, as my invention the manufacture of glassware of this description or character.

I do not claim, broadly, as a new manufacture, an article of glassware composed of two shells or skins with included air-bubbles, the same being described in English Patent No. 2,045 of 1857.

I wish it to be understood that I do not herein claim as a new article of manufacture the glassware herein described when the same presents a shaded appearance—that is, where the tints are modulated from one color into another, or from a tint of one color into a lighter tint of the same color—as I have claimed the same, in substance, in another application, filed November 8, 1886, Serial No. 218,308.

Having described my invention, I claim—.

As a new manufacture, an article of glassware composed of two adherent shells ornamented with air-bubbles or cavities within its walls or between the shells, and having a roughened or lusterless surface, one of said shells being opaque, substantially as described.

In testimony that I claim the foregoing I have hereunto set my hand this 17th day of August, 1886.

JOSEPH WEBB.

Witnesses:
ALFRED S. MOORE,
WINFIELD S. MOORE.